United States Patent
Oka

(10) Patent No.: US 10,122,957 B2
(45) Date of Patent: Nov. 6, 2018

(54) IMAGING APPARATUS

(71) Applicant: Koji Oka, Kanagawa (JP)

(72) Inventor: Koji Oka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/816,394

(22) Filed: Aug. 3, 2015

(65) Prior Publication Data

US 2016/0057379 A1 Feb. 25, 2016

(30) Foreign Application Priority Data

Aug. 19, 2014 (JP) ................... 2014-166495

(51) Int. Cl.
*H04N 5/76* (2006.01)
*H04N 5/91* (2006.01)
*G11B 27/034* (2006.01)
*H04N 5/232* (2006.01)
*H04N 5/77* (2006.01)
*H04N 9/804* (2006.01)

(52) U.S. Cl.
CPC ............ *H04N 5/91* (2013.01); *G11B 27/034* (2013.01); *H04N 5/23245* (2013.01); *H04N 5/23293* (2013.01); *H04N 5/772* (2013.01); *H04N 9/8042* (2013.01)

(58) Field of Classification Search
CPC .. H04N 5/91; H04N 5/23245; H04N 5/23293; H04N 5/772; H04N 9/8042; G11B 27/034
USPC ........................................... 348/231.2, 231.3
See application file for complete search history.

(56) References Cited

U.S. PATENT DOCUMENTS

| 5,521,335 | A | 5/1996 | Oka |
| 5,745,688 | A | 4/1998 | Oka |
| 5,760,345 | A | 6/1998 | Oka |
| 2003/0234877 | A1 | 12/2003 | Kanehiro et al. |
| 2004/0125214 | A1 | 7/2004 | Oka et al. |
| 2005/0012828 | A1 | 1/2005 | Oka |
| 2006/0072028 | A1 | 4/2006 | Hong |
| 2006/0197976 | A1 | 9/2006 | Oka |
| 2007/0030512 | A1 | 2/2007 | Oka |
| 2008/0136937 | A1* | 6/2008 | Murakoshi ............. H04N 5/775 348/231.2 |

(Continued)

FOREIGN PATENT DOCUMENTS

| EP | 2 129 111 A1 | 12/2009 |
| JP | 2010-56875 | 3/2010 |

(Continued)

OTHER PUBLICATIONS

Office Action dated Apr. 28, 2016 in Korean Patent Application No. 10-2015-0116085 with English translation.

(Continued)

*Primary Examiner* — Sinh Tran
*Assistant Examiner* — Zhenzhen Wu
(74) *Attorney, Agent, or Firm* — Oblon, McClelland, Maier & Neustadt, L.L.P.

(57) ABSTRACT

An imaging apparatus that records separately shot two images as one image file includes a clip image shooting mode that creates the one image file having one of the separately shot two images as a supplemental image of the other of the separately shot two images as a main image.

16 Claims, 7 Drawing Sheets

(56) References Cited

U.S. PATENT DOCUMENTS

| | | | |
|---|---|---|---|
| 2009/0122159 A1* | 5/2009 | Sakaue | H04N 5/23293 348/231.99 |
| 2009/0207279 A1* | 8/2009 | Ochi | H04N 5/23219 348/231.99 |
| 2010/0026843 A1 | 2/2010 | Tezuka et al. | |
| 2010/0100628 A1 | 4/2010 | Oka | |
| 2010/0134644 A1 | 6/2010 | Kita | |
| 2010/0266160 A1* | 10/2010 | Yamada | H04N 1/2133 382/103 |
| 2011/0018970 A1 | 1/2011 | Wakabayashi | |
| 2011/0018971 A1 | 1/2011 | Hasegawa | |
| 2011/0145804 A1 | 6/2011 | Oka | |
| 2011/0234853 A1 | 9/2011 | Hayashi et al. | |
| 2011/0234881 A1 | 9/2011 | Wakabayashi et al. | |
| 2012/0069217 A1* | 3/2012 | Osuka | H04N 5/232 348/231.6 |
| 2012/0212641 A1 | 8/2012 | Tezuka et al. | |
| 2012/0212648 A1 | 8/2012 | Oka | |
| 2013/0016957 A1 | 1/2013 | Hamada | |
| 2013/0265466 A1* | 10/2013 | Jung | H04N 5/232 348/239 |
| 2014/0146212 A1* | 5/2014 | Jung | H04N 5/23293 348/333.01 |
| 2014/0210955 A1* | 7/2014 | Fujita | G03B 35/08 348/50 |
| 2014/0354852 A1* | 12/2014 | Won | H04N 5/2628 348/239 |

FOREIGN PATENT DOCUMENTS

| | | |
|---|---|---|
| JP | 2010-130437 A | 6/2010 |
| JP | 2011-205530 A | 10/2011 |
| JP | 5141447 B2 | 2/2013 |
| KR | 10-2010-0066864 A | 6/2010 |
| RU | 2012 141 873 A | 4/2014 |

OTHER PUBLICATIONS

Combined Russian Office Action and Search Report dated Mar. 25, 2016 in Patent Application No. 2015134501/07(052983) (with English language translation).

Extended European Search Report dated Jan. 19, 2016 in European Patent Application No. 15180601.5.

Office Action dated May 15, 2018 in corresponding Japanese Patent Application No. 2014-166495, 3 pages.

\* cited by examiner

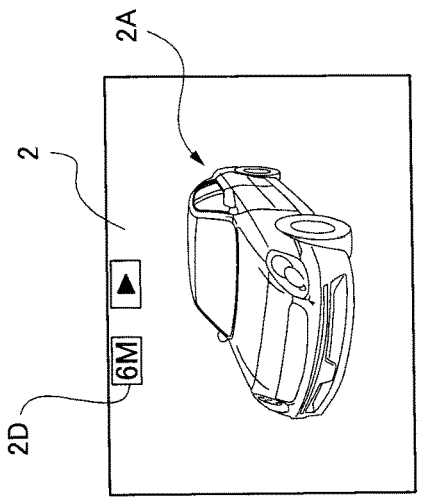
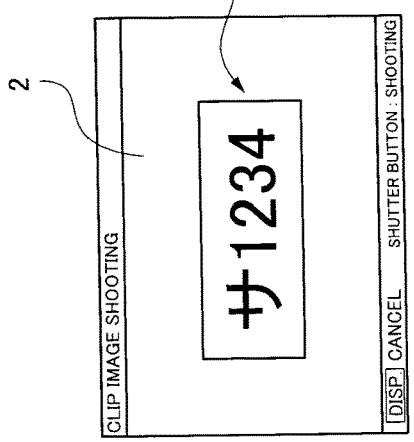
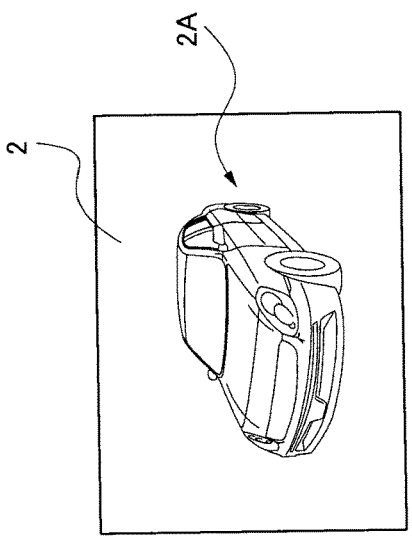

IMAGING APPARATUS

CROSS-REFERENCE TO RELATED APPLICATION

The present application is based on and claims priority from Japanese Patent Application Number 2014-166495, filed Aug. 19, 2014, the disclosure of which is hereby incorporated by reference herein in its entirety.

BACKGROUND

Field of the Invention

The present invention relates to an imaging apparatus that manages image data in association with each other.

Description of the Related Art

An apparatus that manages image files has been known by for example, Japanese Patent Publication No. 5141447. This apparatus is configured to record two images of a main image and a sub-image recoded in an image file different from that of the main image in association with each other, and to display the main image and the sub-image in association with each other. This apparatus is also configured to determine the updating of the image when one of the images is updated.

SUMMARY

An object of the present invention is to provide an imaging apparatus that can manage two different image data of supplemental image data and main image data as one image file by adding the supplemental image data to an image file of the main image data.

An imaging apparatus that records separately shot two images as one image file includes a clip image shooting mode that creates the one image file having one of the separately shot two images as a supplemental image of the other of the separately shot two images as a main image.

BRIEF DESCRIPTION OF THE DRAWINGS

FIGS. 7A to 7C are views each showing one example of transition of the monitor screen by a display button illustrated in FIG. 1 in a reproduction mode switched by a shooting and reproduction switching button illustrated in FIG. 1, FIG. 7A shows the monitor screen on which the main image is displayed, FIG. 7B shows the monitor screen on which the supplemental image is displayed, and FIG. 7C shows the monitor screen on which the main image is displayed along with an image size.

DETAILED DESCRIPTION

Hereinafter, an embodiment of a digital still camera (digital camera) as an imaging apparatus will be described with reference to the drawings.

Figure 1:
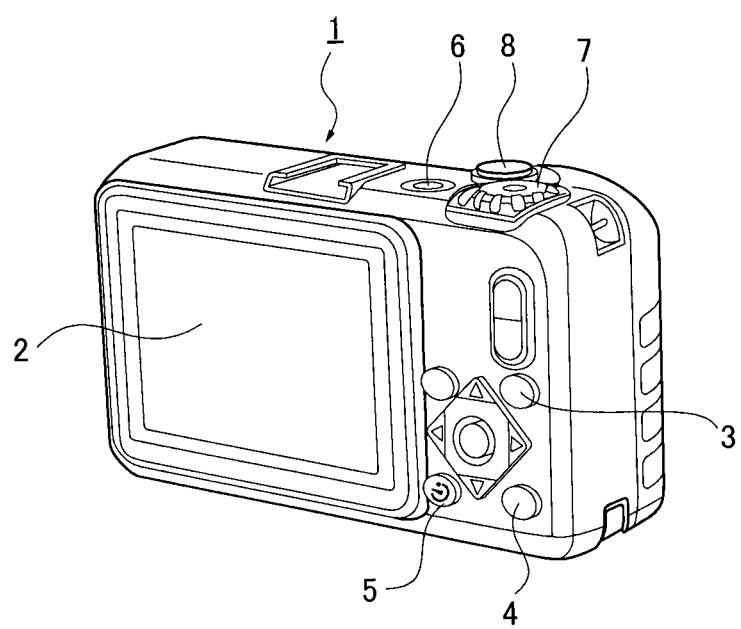
FIG. 1 is an external appearance view illustrating a digital still camera according to an embodiment of an imaging apparatus of the present invention.

At first, an external appearance configuration of the digital still camera will be briefly described. FIG. 1 is a perspective view showing a back face of the digital still camera.

Referring to FIG. 1, a digital still camera 1 includes a back face and a top face. The back face of the digital still camera 1 includes a monitor screen 2 as a display screen, a shooting and reproduction switching button 3, a display button 4 as a reproduction section, a self-timer key 5, and various operation members.

The top face of the digital still camera 1 includes a power source button 6, a mode setting dial 7, a shutter button 8, and various operation members.

The functions of the monitor screen 2, shooting and reproduction switching button 3, display button 4, self-timer key 5, power source button 6, and shutter button 8 will be described later. Since the other operation members are irrelevant to the present invention, the description thereof will be omitted.

When the power source button 6 is turned on, the digital still camera 1 displays a through image on the monitor screen 2 by the after-described computer (CPU).

Next, the circuit block diagram of the digital still camera 1 will be described.

Figure 2:
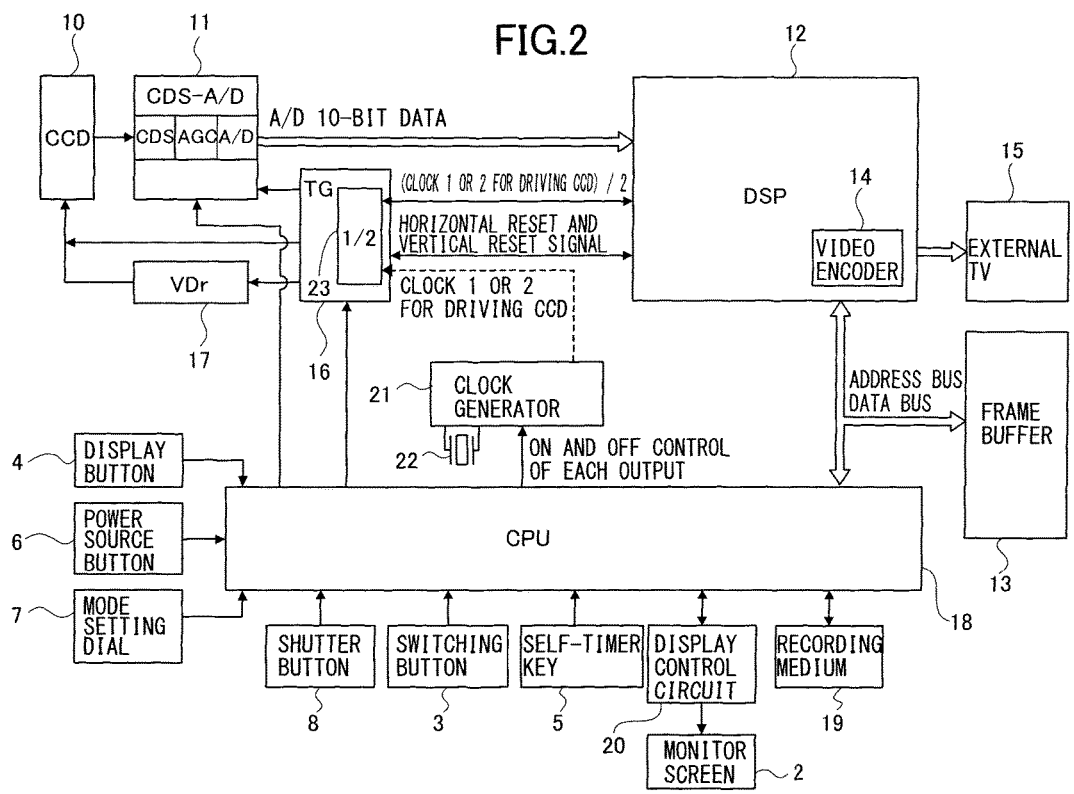
FIG. 2 is a block diagram for explaining the digital still camera illustrated in FIG. 1.

The digital still camera 1 includes a solid state imaging element (CCD) 10 as illustrated in FIG. 2.

Light from a subject is imaged on the solid state imaging element 10 through a not-shown lens. The solid state imaging element 10 photoelectrically converts the subject light into picture signals and outputs the picture signals to a sampling and analogue-digital convertor (CDS and A/D convertor) 11.

The sampling and analogue-digital convertor 11 correlatively double-samples the picture signals to eliminate noise signals, converts the signals into 10-bit image data, and outputs the image data to an image processor (DSP) 12.

The image processor 12 executes known processes such as a white balance process, aperture emphasizing process, and interpolating process to the 10-bit image data sent from the sampling and analogue-digital convertor 11.

The image processor 12 converts the 10-bit image data sent from the sampling and analogue-digital convertor 11 into a brightness signal Y and a color difference signal Cb and Cr, and temporally stores and accumulates the signals in a frame buffer memory 13.

While monitoring the digital still camera 1, namely, while the through image is displayed on the monitor screen 2, these processes are repeated. The image processor 12 includes a video encoder 14.

The image data temporally stored and accumulated in the frame buffer memory 13 is sequentially read by the video encoder 14, is converted into video signals, and outputs to a display 15 such as an external TV.

The solid state imaging element 10 is driven and scanned by a horizontal driving pulse output from a timing generator (TG) 16, a vertical driving pulse output from a vertical driver (VDr) 17, and an electric shutter pulse.

The digital still camera 1 is integrally controlled by a computer (CUP) 18. The shooting and reproduction switching button 3, the display button 4, the self-timer key 5, the other operation members, a recording medium 19, and a display control circuit 20 are connected to the computer 18.

The computer 18 controls the timing generator 16, a clock generator 21, and the sampling and analogue-digital convertor 11 based on electric shutter pulses.

The timing generator 16 outputs the vertical driving pulses to the vertical driver 17 and a predetermined clock to the sampling and analogue-digital convertor 11.

The clock generator 21 is connected to a crystal oscillator 22 for driving a CCD. The clock generator 21 includes a not-shown frequency dividing circuit that divides a clock of an oscillating frequency of the crystal oscillator 22.

The clock generator 21 outputs a driving pulse for driving the solid state imaging element to the timing generator 16.

The timing generator 16 includes a frequency dividing circuit 23. The frequency dividing circuit 23 selectively divides the driving pulse for driving the solid state imaging element by one or two.

The frequency dividing circuit 23 outputs a frequency divided clock to the image processor 12. The image processor 12 includes a not-shown internal counter. Since the operation and effect of the frequency dividing circuit 23 are irrelevant to the present invention, the detailed description thereof is omitted.

When the number of driving pulses by the counter reaches a predetermined count number, the image processor 12 outputs a horizontal reset signal and a vertical reset signal to the timing generator 16.

Figure 3:
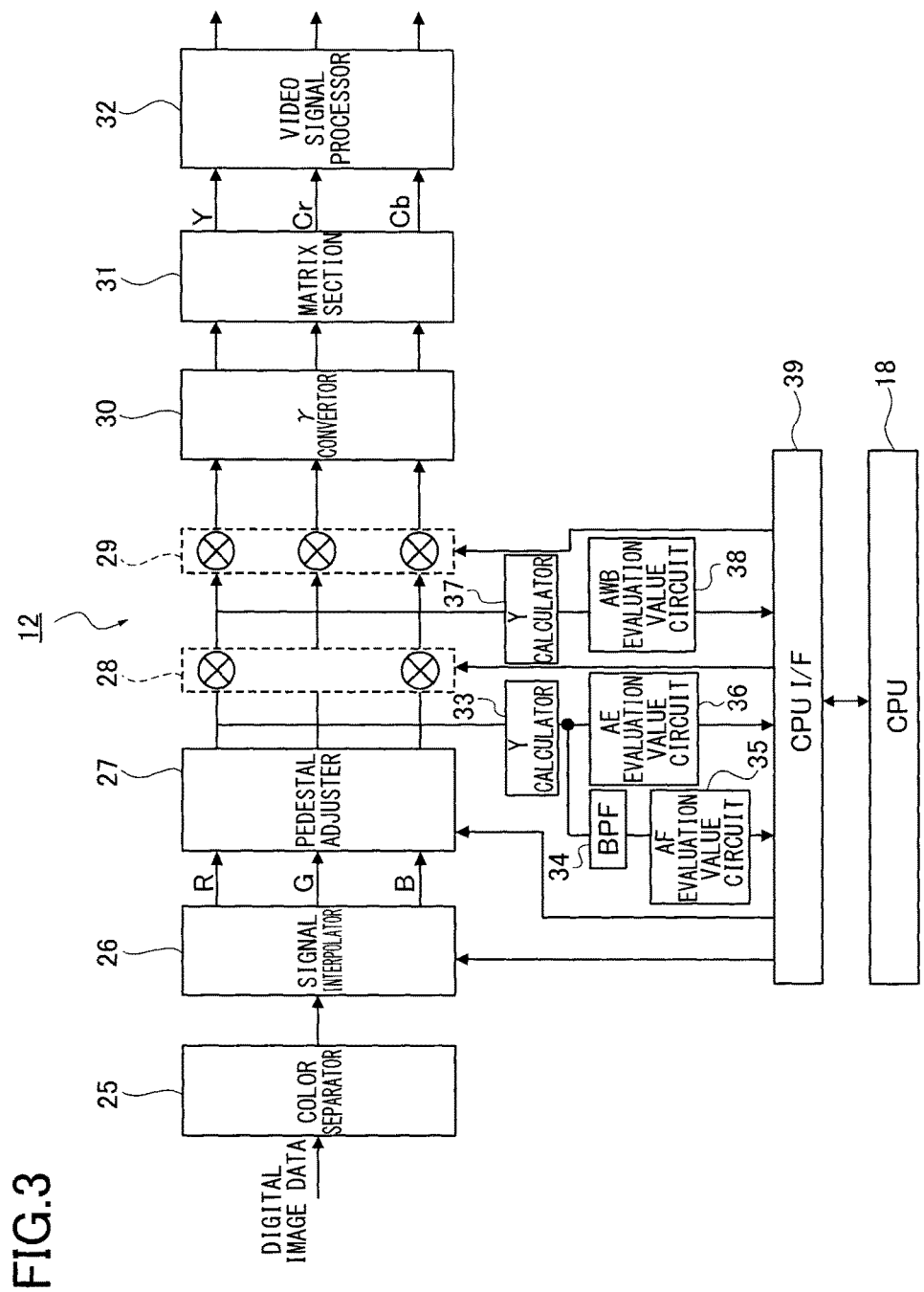
FIG. 3 is a block diagram showing main configurations of an image processor illustrated in FIG. 2, FIGS. 4A to 4D are views each showing one example of display of a monitor screen of the digital still camera illustrated in FIG. 1.

The image processor 12 includes a color separator 25, signal interpolator 26, pedestal adjustor 27, white balance adjustor 28, digital gain adjustor 29, gamma convertor 30, matrix section 31, and video signal processor 32, as illustrated in FIG. 3.

The color separator 25 separates the 10-bit image data output from the sampling and analogue-digital convertor 11 into respective color components such as R, G, and B. The signal interpolator 26 executes a known interpolating process to the respective image data of R, G, and B.

The pedestal adjustor 27 adjusts a black level of the respective image data of R, G, and B. The white balance adjustor 28 adjusts a white level of the respective image data of R, G, and B. The digital gain adjustor 29 adjusts a digital count value of the respective image data of R, G, and B by the gain set by the computer 18.

The gamma convertor 30 executes y conversion of R, G, and B. The matrix section 31 separates the respective image data of R, G, and B into the color difference signal Cb and Cr and the brightness signal Y. The video signal processor 32 creates the video signal based on the color difference signal Cb and Cr and the brightness signal Y, and outputs the signals to the video encoder 14 and the display control circuit 20.

The image processor 12 further includes a Y calculator 33, bypass filter (BPF) 34, AF evaluation value circuit 35, AE evaluation value circuit 36, Y calculator 37, AWB evaluation value circuit 38, and computer interface (CPU I/F) 39.

The Y calculator 33 detects brightness data of the image data after the pedestal adjustment. The bypass filter 34 allows passage of only the brightness data of a predetermined frequency component in the brightness data detected by the Y calculator 33.

The AF evaluation value circuit 35 outputs the integrated value of the brightness data passed through the bypass filter 34 as an AF evaluation value to the computer 18. The Y calculator 37 outputs the digital count value according to the brightness data detected by the Y calculator 33 as an AWB evaluation value to the computer 18.

A focused position is detected by the solid state imaging element 10. The computer 18 detects a peak position of the AF evaluation values with a hill climbing servo method by sampling the focus evaluation values (AF evaluation value) showing the contrast of a subject. Since these automatic focusing process and exposure evaluation process are known processes, the detailed description thereof is omitted.

Hereinafter, the details of the embodiment of the present invention will be described.

Figure 4A:
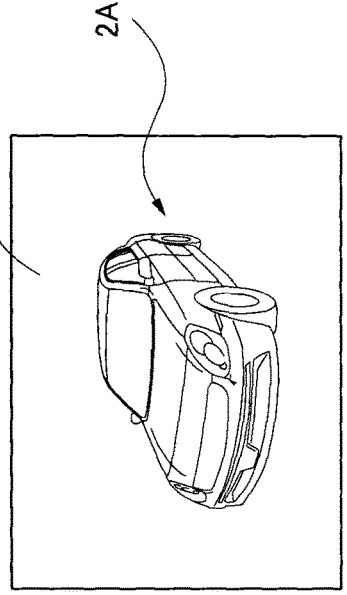
FIG. 4A shows that a vehicle as a main image is displayed as a through image for monitoring in a main image shooting mode.

When a power source of the digital still camera 1 is turned on and a shooting mode is selected, the computer 18 executes the shooting mode that displays the through image on the monitor screen 2 for monitoring as illustrated in FIG. 4A.

FIG. 4A shows that a vehicle 2A as a subject is displayed on the monitor screen 2 for monitoring.

The digital still camera 1 includes a clip image shooting mode that creates one image file having one shot image as the supplemental image of the other shot image as the main image. The clip image shooting mode includes as shooting modes a supplemental image shooting mode that previously shoots an image as supplemental image data and a main image shooting mode that shoots an image as main image data after shooting the image as the supplemental image data.

The supplemental image shooting mode (clip shooting mode) is set on the initial menu setting screen of the monitor screen 2.

"Supplemental Image ON/OFF" is displayed on the initial menu setting screen along with various items. When "On" is selected in "Supplemental Image ON/OFF", the computer 18 sets supplemental image shooting (clip image shooting) to an effective mode.

In this embodiment, the main image shooting mode and the supplemental image shooting mode are switched by the self-timer key 5. Namely, the self-timer key 5 operates as a switching key that switches the supplemental image shooting mode and the main image shooting mode. Note that in the main image shooting mode the shooting cannot be performed by the self-timer key 5 that presses a shutter after the elapse of a predetermined time.

Figure 4B:
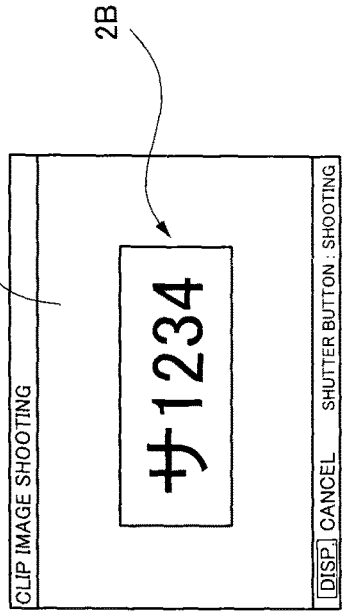
FIG. 4B shows that a number plate as a supplemental image is displayed for monitoring in a supplemental image shooting mode.

In the supplemental image shooting mode, the computer 18 sets the shooting mode to a macro shooting mode that macro shoots the supplemental image illustrated in FIG. 4B. Namely, the computer 18 is set to a mode that shoots a subject image by enlarging the subject image. FIG. 4B shows that a number plate 2B of a vehicle as the supplemental image is displayed as a through image for monitoring.

The computer 18 includes a determination part that determines the presence and absence of the supplemental image data. In the main image shooting mode, the computer 18 displays an icon 2C showing the presence of the supplemental image on the monitor screen 2 along with the vehicle 2A as the through image illustrated in FIG. 4C when the supplemental image is stored.

The supplemental image data is temporarily accumulated and stored in the frame buffer memory 13 when the shutter button 8 is pressed under a predetermined condition before shooting the main image.

Figure 4C:
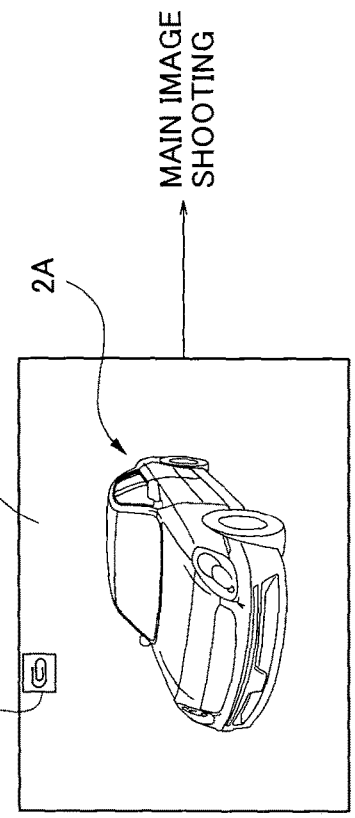
FIG. 4C shows that an icon showing the presence of the shot supplemental image is displayed on the monitor screen on which the vehicle as the main image is displayed as the through image for monitoring in the main image shooting mode.
Figure 4D:
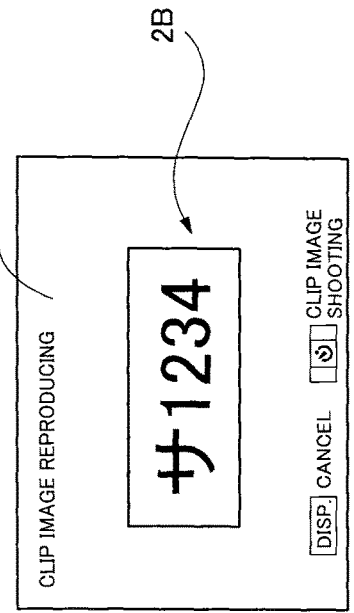
FIG. 4D shows that the number plate as the supplemental image is reproduced and displayed in response to operation of a self-timer key when the supplemental image has been shot in a shooting mode.

The computer 18 reproduces and displays the number plate 2B as the supplemental image on the monitor screen 2 as illustrated in FIG. 4D when the self-timer key 5 is pressed while the icon 2C illustrated in FIG. 4C is displayed on the monitor screen 2. A user therefore can check a quality of the supplemental image to be added to the main image before shooting the main image.

The display button 4 is used as a cancel button in the shooting mode. In the supplemental image shooting mode in which the number plate 2B illustrated in FIG. 4B is displayed on the monitor screen 2 as a monitoring image, when the display button 4 is pressed, the vehicle 2A illustrated in FIG. 4A is displayed as the through image (monitoring image).

When the display button 4 is pressed while the number plate 2B is reproduced and displayed on the monitor screen 2 as illustrated in FIG. 4D, the shooting mode returns to the main image shooting mode in which the vehicle 2A is displayed as the through image as illustrated in FIG. 4C.

While the supplemental image is reproduced and displayed on the monitor screen 2 as illustrated in FIG. 4D, when the self-timer key 5 as the switching key is pressed, the computer 18 changes the shooting mode to the supplemental image shooting mode from a state in which the supplemental image is reproduced and displayed on the monitor screen 2.

Namely, when the self-timer key 5 is pressed while the number plate 2B as the supplemental image is displayed on the monitor screen 2 as illustrated in FIG. 4D, the shooting mode is changed to the supplemental image shooting mode in which the supplemental image is displayed as a monitoring image illustrated in FIG. 4B from a state in which the number plate 2B is reproduced and displayed as the supplemental image as illustrated in FIG. 4D.

In this case, when a subject for the supplemental image is changed from the number plate 2B to a door mirror of a vehicle, the door mirror of the vehicle can be obtained as the supplemental image. In this embodiment, a plurality of supplemental images to be added to the main image can be obtained.

The computer 18 also directly changes the shooting mode from the main image shooting mode to the supplemental image shooting mode in response to the operation of the self-timer key 5 when the supplemental image is not stored.

Figure 5:
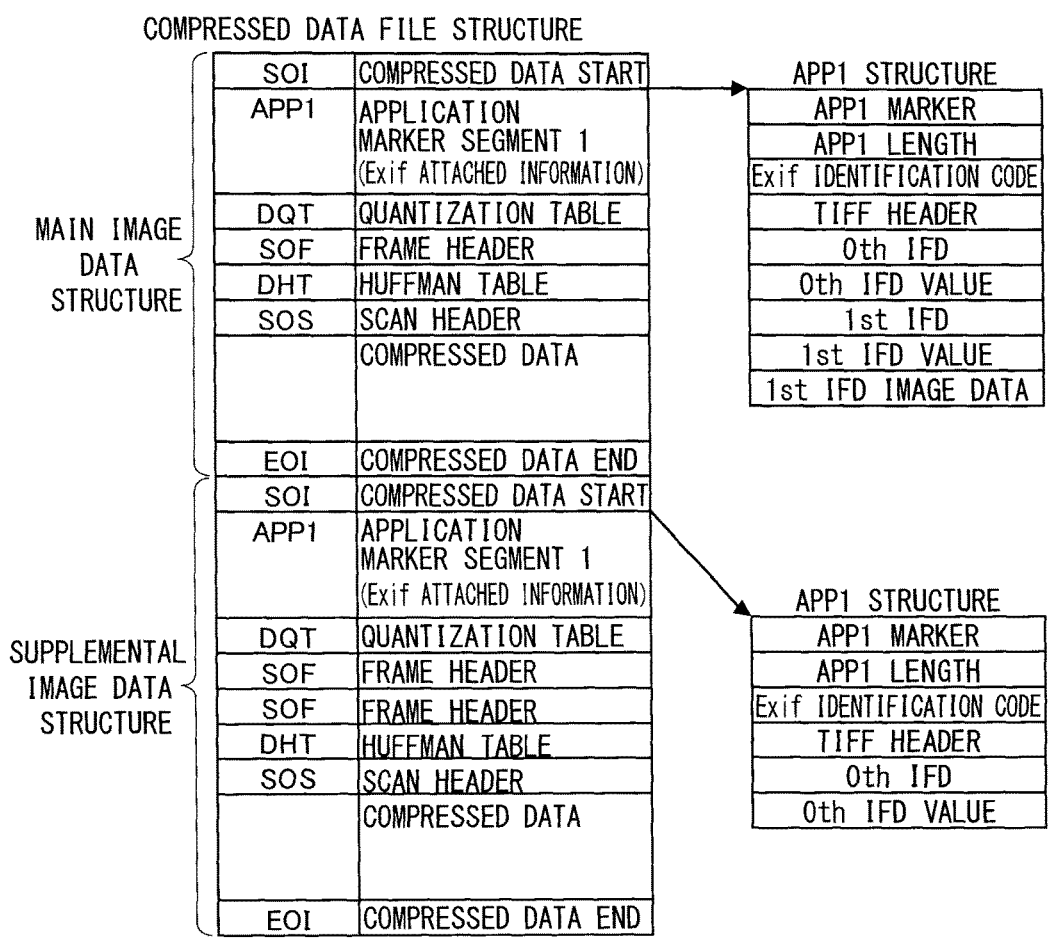
FIG. 5 is a view showing one example of a file structure of image data according to the embodiment of the present invention.

The computer 18 determines the presence and absence of the supplemental image, and selects a file structure of compressed data when shooting the main image. FIG. 5 shows one example of the file structure of the compressed data.

The file structure of the compressed data includes the main image data and the supplemental image data. The main image data includes SOI (compressed data start), APP1 (application and marker segment 1 (Exif attached information)), DQT (quantization table), SOF (frame header), DHT (Huffman table), SOS (scan header), compressed data, and EOI (compressed data end).

The supplemental image data also includes SOI (compressed data start), APP1 (application and marker segment 1 (Exif attached information)), DQT (quantization table), SOFs (frame header), DHT (Huffman table), SOS (scan header), compressed data, and EOI (compressed data end).

The structure of the APP1 of the main image data includes APP1 Marker, APP1 Length, Exif identification code, TIFF Header, 0th IFD, 0th IFD Value, 1st IFD, 1st IFD Value, and 1st IFD image data.

The structure of the APP1 of the supplemental image data includes APP1 Marker, APP1 Length, Exif identification code, TIFE Header, 0th IFD, and 0th IFD Value. In addition, since the respective items of the compressed data are known, the detailed description thereof is omitted.

The computer 18 creates the compressed data of the supplemental image in addition to the compressed data of the main image after the shooting of the main image is completed when the supplemental image is stored. The computer creates only the compressed data of the main image in accordance with the file structure of the main image at the same time as the completion of the shooting of the main image when the supplemental image is not stored.

FIG. 5 shows the file structure of the compressed data in which one supplemental image is added to one main image. However, when a file structure in which a plurality of supplemental images is added to one main image is used, a plurality of supplemental images can be linked to one main image in one image file.

Figure 6:
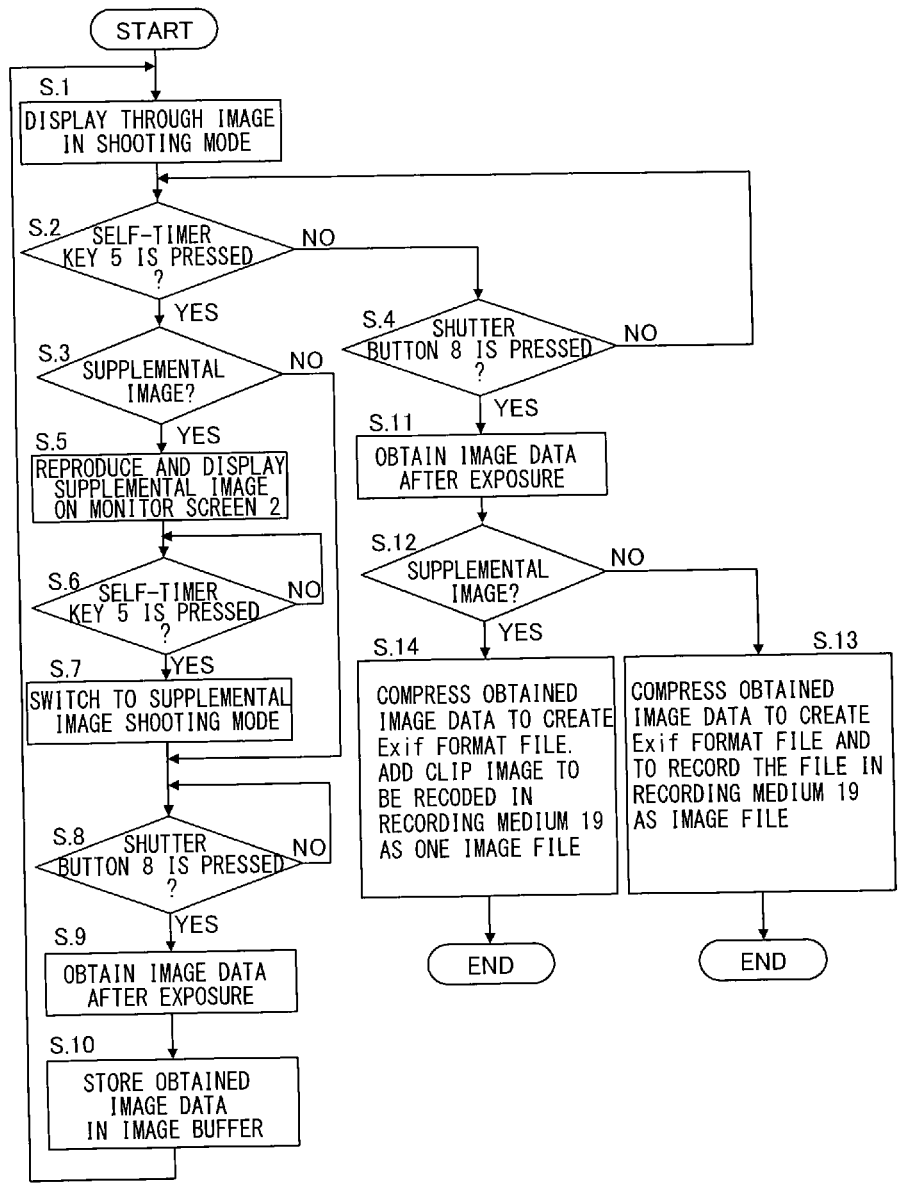
FIG. 6 is a flowchart showing one example of a method of using a digital still camera according to the embodiment of the present invention.

Hereinafter, the details of the shooting mode will be described with reference to the flowchart illustrated in FIG. 6.

When the power source button 6 is turned on, the digital still camera 1 is set to the main image shooting mode in which the through image is displayed for monitoring as illustrated in FIG. 4A in S1.

Next, the computer 18 determines whether or not the self-timer key 5 is pressed in S2. When the self-timer key 5 is pressed, the digital still camera 1 is changed to the supplemental image shooting mode from the main image shooting mode. The computer 18 determines the presence and absence of the supplemental image in S3. When the self-timer key 5 is not pressed, the main image shooting mode is maintained in S2 and S4 until the shutter button 8 is pressed in S4.

When the supplemental image shot before shooting the main image is stored in S3, the computer 18 displays the icon 2C on the monitor screen 2 on which the main image is displayed for monitoring as illustrated in FIG. 4C.

While the icon 2C is displayed, when the self-timer key 5 is pressed in S2 and S3, the supplemental image is reproduced and displayed on the monitor screen 2 as illustrated in FIG. 4D in S5. The contents and the shooting quality of the supplemental image can be therefore reconfirmed before shooting the main image.

While the supplemental image is reproduced and displayed on the monitor screen 2 as illustrated in FIG. 4D, when the self-timer key 5 is pressed in S6, the monitor screen 2 returns to the monitor screen 2 on which the supplemental image is displayed for monitoring as illustrated in FIG. 4B. Namely, the computer 18 determines whether or not the shutter button 8 is pressed in S8 after the reproduction display mode that reproduces and displays the supplemental image is switched to the supplemental image shooting mode that shoots the supplemental image in S7.

While the supplemental image is reproduced and displayed on the monitor screen 2 as illustrated in FIG. 4D, when the display button 4 is pressed, the monitor screen 2 returns to the monitor screen 2 for monitoring the main image as illustrated in FIG. 4C. Namely, while the supplemental image is reproduced and displayed as illustrated in FIG. 4D, when the display button 4 is pressed, the flow proceeds to S2 and the computer 18 determines whether or not the self-timer key 5 is pressed in S2.

When the supplemental image is not stored in S3, the flow proceeds to S8. S8 is repeated until the shutter button 8 is pressed.

When the shutter button 8 is pressed in S8, the computer 18 executes the exposure process, obtains the image data after the exposure process is completed as the supplemental image data in S9, and temporary accumulates and stores the supplemental image data in the frame buffer memory 13 in S10.

Next, the flow returns to S1 and the computer 18 executes the through image display process in S1. Then the flow proceeds to S2 and the computer 18 determines whether or not the self-timer key 5 is pressed in S2.

When the self-timer key 5 is not pressed in S2, the computer 18 is changed to the main image shooting mode in S4. When the supplemental image is obtained, the icon 2C is displayed as illustrated in FIG. 4C. Thus, the supplemental image can be reliably obtained.

In the main image shooting mode in S4, the computer 18 determines whether or not the shutter button 8 is pressed. When the shutter button 8 is not pressed, the flow returns to S2 to determine whether or not the self-timer key 5 is pressed.

When the shutter button 8 is pressed in S4, the computer 18 executes the exposure process, and obtains the image data after the exposure process is completed as the main image data in S11. Next, the computer 18 determines the presence and absence of the supplemental image data in S12.

When the supplemental image data is not stored, the computer 18 compresses the main image data, creates the image file of Exif format, and records the file in the recording medium 19 in S13.

When the supplemental image data is stored, the computer 18 compresses the main image data, creates one image file by adding the supplemental image data to the main image data for creating the image file of Exif format, and records and stores the image file in the recording medium 19 in S14.

After shooting, when the recording and reproduction switching button 3 is pressed, the shooting mode is switched to the reproduction mode. The computer 18 reads the image file from the recording medium 19 in the reproduction mode. In the reproduction mode, as illustrated in FIG. 7A, the main image is reproduced and displayed on the monitor screen 2. In this embodiment, the vehicle 2A is displayed as the main image.

While the main image is reproduced and displayed on the monitor screen 2 and a camera memo is ON, when the display button 4 as a reproducer is pressed, the camera memo and the main image are reproduced and displayed on the monitor screen 2. Namely, the text information is added to the main image.

While the camera memo and the main image are reproduced and displayed on the monitor screen 2, when the display button 4 is again pressed, the supplemental image can be displayed on the monitor screen 2. In this case, when the supplemental image data is stored, the supplemental image is reproduced and displayed as illustrated in FIG. 7B while the supplemental image is not reproduced and displayed on the monitor screen 2 when the supplemental image is not stored. In this embodiment, the number plate 2B is displayed as the supplemental image as illustrated in FIG. 7B.

While the supplemental image is displayed on the monitor screen 2, when the display button 4 is again pressed, size information 2D of the image file is displayed on the monitor screen 2 along with the main image as illustrated in FIG. 7C.

Next, when the display button 4 is pressed, histogram is added, and the main image can be displayed on the monitor screen 2. In this case, when the display button 4 is pressed, the monitor screen 2 returns to the initial monitor screen 2 as illustrated in FIG. 7A.

Through the repetition of the pressing of the display button 4, the main image, the main image with the camera memo, the supplemental image, the main image with the image size information, and the main image with the histogram information are toggled on the monitor screen 2 in order. In addition, since a method of setting the camera memo on the initial menu setting screen in the monitor screen 2 is a known method, the detailed description thereof is omitted.

According to the present invention, when both an entire image and a detail image are required, a plurality of supplemental images and a main image can be linked in one file for creating and reproducing an image. Thus, the image can be easily managed.

The digital still camera 1 according to the present embodiment is useful for creating an entire image and a detail image of a vehicle for selling used cars at an auction.

According to the embodiment of the present invention, the supplemental image and the main image can be reliably linked, and the supplemental image can be reproduced when reproducing the main image.

Although the embodiment of the present invention has been described above, the present invention is not limited thereto. It should be appreciated that variations may be made in the embodiment described by persons skilled in the art without departing from the scope of the present invention.

What is claimed is:

1. An imaging apparatus, comprising:
   a sensor;
   a lens to receive light and to focus the light on the sensor;
   a display; and
   a controller which controls the imaging apparatus to perform:
   determining whether there exists input indicating whether the imaging apparatus is to operate in a second shooting mode;
   capturing, in a first shooting mode when there does not exist input indicating the imaging apparatus is to operate in the second shooting mode, a first image using the sensor and the lens, the first image being a main image;
   determining, when the input exists indicating that the imaging apparatus is to operate in the second shooting mode, whether an image has been stored which was previously captured in the second shooting mode;
   displaying, when it has been determined that the image has been stored which was previously captured in the second shooting mode exists, the image which has been stored which was previously captured in the second shooting mode;
   capturing, in the second shooting mode when the input exists indicating that the imaging apparatus is to operate in the second shooting mode, a second image, using the sensor and the lens, the second image being different from the first image and the second image being a supplemental image of the main image;

combining the first image and the second image into a single image file, wherein in the first shooting mode, if the second image is already captured, the first image and the second image are combined into the single image file.

2. The imaging apparatus according to claim 1, wherein: in the first shooting mode used when capturing the first image, supplemental image data which is image data of the second image is added for creating an image file of the main image data, and the image file is recorded in a recording medium.

3. The imaging apparatus according to claim 2, wherein the supplemental image is shot by macro shooting in the second shooting mode.

4. The imaging apparatus according to claim 2, wherein: the controller further determines a presence and an absence of the supplemental image data, and in the first shooting mode, when the supplemental image is stored, an icon showing the presence of the supplemental image is displayed on the display.

5. The imaging apparatus according to claim 1, further comprising:

a switching key that switches the second shooting mode used when capturing the second image and the first shooting mode used when capturing the first image, wherein the controller reproduces and displays the supplemental image on the display in response to operation of the switching key while the icon is displayed on the display in the first shooting mode.

6. The imaging apparatus according to claim 5, wherein: the controller changes a shooting mode to the second shooting mode from a state in which the supplemental image is reproduced and displayed on the display in response to the operation of the switching key while the supplemental image is reproduced and displayed on the display.

7. The imaging apparatus according to claim 4, wherein: the controller changes a shooting mode from the first shooting mode to the second shooting mode used when capturing the second image in response to operation of a switching key when the supplemental image is not stored.

8. The imaging apparatus according to claim 5, wherein: the controller changes a shooting mode from the first shooting mode to the second shooting mode in response to operation of the switching key when the supplemental image is not stored.

9. The imaging apparatus according to claim 6, wherein: the controller changes a shooting mode from the first shooting mode to the second shooting mode in response to operation of the switching key when the supplemental image is not stored.

10. The imaging apparatus according to claim 1, wherein: the image file includes a plurality of supplemental images.

11. The imaging apparatus according to claim 1, wherein the controller further:

sequentially reproduces the supplemental image and the main image.

12. A method, comprising:

determining whether there exists input indicating whether an imaging apparatus is to operate in a second shooting mode;

determining, when the input exists indicating that the imaging apparatus is to operate in the second shooting mode, whether an image has been stored which was previously captured in the second shooting mode;

displaying, when it has been determined that the image has been stored which was previously captured in the second shooting mode exists, the image which has been stored which was previously captured in the second shooting mode;

obtaining, in the second shooting mode when the input exists indicating that the imaging apparatus is to operate in the second shooting mode, a second image as supplemental image data using an image sensor and a lens;

obtaining, in a first shooting mode when the input does not exist indicating that the imaging apparatus is to operate in the second shooting mode, a first image as main image data using the image sensor and the lens;

combining the supplemental image data and the main image data into a single image file, and recording the image file in a recording medium, wherein in the first shooting mode, if the second image is already captured, the first image and the second image are combined into the single image file.

13. The imaging apparatus according to claim 1, wherein: when capturing the first image which is a main image, when the supplemental image is stored, an icon showing the presence of the supplemental image is displayed on the display.

14. The shooting method according to claim 12, wherein: when capturing the first image which is a main image, when the supplemental image is stored, an icon showing the presence of the supplemental image is displayed on a display.

15. The imaging apparatus according to claim 1, wherein the controller further performs:

determining a second time whether there exists input indicating whether the imaging apparatus is to operate in the second shooting mode, wherein the capturing in the second mode is performed in response to the determining the second time that there exists input indicating that the imaging apparatus is to operate in the second shooting mode.

16. The method according to claim 12, further comprising:

determining a second time whether there exists input indicating whether the imaging apparatus is to operate in the second shooting mode, wherein the obtaining in the second shooting mode is performed in response to the determining the second time that there exists input indicating that the imaging apparatus is to operate in the second shooting mode.

* * * * *